(12) United States Patent
Wallace et al.

(10) Patent No.: US 10,225,995 B2
(45) Date of Patent: Mar. 12, 2019

(54) CANOPY HOIST

(71) Applicants: David Wallace, Petrolia, CA (US); Matthew Aaron Vallotton, Whitehorn, CA (US)

(72) Inventors: David Wallace, Petrolia, CA (US); Matthew Aaron Vallotton, Whitehorn, CA (US)

(*) Notice: Subject to any disclaimer, the term of this patent is extended or adjusted under 35 U.S.C. 154(b) by 0 days.

(21) Appl. No.: 14/616,725

(22) Filed: Feb. 8, 2015

(65) Prior Publication Data
US 2016/0205874 A1 Jul. 21, 2016
US 2017/0006784 A9 Jan. 12, 2017

Related U.S. Application Data

(60) Provisional application No. 61/937,573, filed on Feb. 9, 2014.

(51) Int. Cl.
*A01G 13/02* (2006.01)
*F16M 13/02* (2006.01)

(52) U.S. Cl.
CPC ....... *A01G 13/025* (2013.01); *A01G 13/0231* (2013.01); *F16M 13/02* (2013.01)

(58) Field of Classification Search
CPC .............. A01G 13/0206; A01G 13/025; A01G 13/0225; A01G 9/22; A01G 13/04; A01G 9/1407; A01G 13/0231; A01G 9/16; A01G 9/222; A01G 9/241; A01G 9/242; A01G 13/043; A01G 13/10; A01G 17/06; A01G 13/02; A01G 13/0212; A01G 13/0281; A01G 13/0287; A01G 9/14; Y10T 156/1715; Y10T 29/49826; E04B 1/343; E04B 1/3404; E04B 1/3416; E04B 1/34384; E04B 1/3441; E04B 7/14; E04B 1/34305; E04B 1/34357; E04B 2001/34394; E04B 7/107; E04B 9/0428; E04B 1/34; E04B 1/355; E04B 7/163; E04B 7/24; E04B 1/34368; E04B 1/3448; E04B 1/3211; E04B 2001/2415; E04B 9/0414; E04H 15/64; E04H 2015/326; E04H 15/46; E04H 15/58; E04H 15/18; E04H 15/36; D06F 53/04; D06F 57/12
See application file for complete search history.

(56) References Cited

U.S. PATENT DOCUMENTS 4,244,384 A * 1/1981 Bean ................... E04B 1/32
135/132
4,373,305 A * 2/1983 Russell .................. E04B 1/32
52/64

(Continued)

*Primary Examiner* — Joshua J Michener
*Assistant Examiner* — George Andonyan
(74) *Attorney, Agent, or Firm* — Christopher Darrow (57) ABSTRACT

This disclosure relates to agricultural canopies used primarily to control the amount of light, moisture and heat reaching growing plants within the canopy footprint. More specifically, it relates to mechanisms for pulling a flexible canopy over a support structure and then for removing the canopy to uncover the structure and the plants below. The mechanisms include an arm mounted rotationally on a base. When the arm is rotated in one direction the canopy is pulled over the support structure and when the arm is rotated in the other direction the canopy is pulled off the support structure.

2 Claims, 8 Drawing Sheets

(56) References Cited

U.S. PATENT DOCUMENTS

| | | | | |
|---|---|---|---|---|
| 4,827,957 | A * | 5/1989 | Chang | A01G 9/1407 135/120.2 |
| 5,451,445 | A * | 9/1995 | Wang | A01G 13/0206 160/84.01 |
| 5,579,610 | A * | 12/1996 | Jackson | A01G 1/12 135/141 |
| 8,079,176 | B1 * | 12/2011 | Thead | A01G 13/043 47/29.6 |
| 2008/0148631 | A1 * | 6/2008 | Wan | A01G 13/0206 47/22.1 |
| 2008/0256854 | A1 * | 10/2008 | McIlvenna | A01G 9/16 47/29.5 |
| 2010/0122490 | A1 * | 5/2010 | Stewart | A01G 13/0212 47/29.5 |
| 2011/0168220 | A1 * | 7/2011 | Prusmack | E04B 1/32 135/135 |
| 2013/0255147 | A1 * | 10/2013 | Perricone | A01G 13/0206 47/22.1 |
| 2014/0157662 | A1 * | 6/2014 | Wallace | A01G 9/241 47/17 |
| 2015/0121750 | A1 * | 5/2015 | Looney | A01G 13/0231 47/19.2 |

\* cited by examiner

CANOPY HOIST

RELATED APPLICATION

This application claims the benefit of and priority to U.S. Provisional Application Ser. No. 61/937,573, filed Feb. 9, 2014, the contents of which are incorporated by reference herein in their entirety.

FIELD OF THE DISCLOSURE

This disclosure relates to agricultural canopies used primarily to control the amount of light and/or moisture and/or heat reaching growing plants within the canopy footprint. More specifically, it relates to mechanisms for pulling a flexible canopy over a support structure and then for removing the canopy to uncover the structure and the plants below. The canopy may be fitted with a light impeding material for use with light-deprivation techniques or with a clear material such as a plastic. Clear material will allow light to pass through as in a standard greenhouse. However, unlike a standard greenhouse, the disclosed device facilitates the opening of the clear material to release excess thermal gain and the closing of the material in anticipation of inclement weather. Conversely, the material can be opened (removed) to let a controlled amount of rain into the canopy structure. These features make a canopy structure equipped with the disclosed device much more versatile than a standard greenhouse, which cannot be easily opened and closed to the same extent.

BACKGROUND OF THE DISCLOSURE

Farmers who are familiar with using light-deprivation techniques to increase crop yield are also familiar with the struggle and great effort that comes with pulling heavy blackout tarps over their crops twice or four times daily. With the disclosed device, sometimes referred to as a tarp puller, the process of covering or uncovering any length greenhouse can be accomplished in just a few minutes. Typically, the canopy hoist comprises a set of two heavy-duty galvanized steel units. With one installed on each side of the greenhouse, the task can be completed quickly and with much less effort by just one person.

In the disclosed embodiment, telescoping steel tubing as part of the arm can be adjusted to fit typical greenhouse sizes such as 20 feet wide and 10' tall, but can also be used on much larger greenhouses such as 40 feet wide by 140 feet long by 18 feet tall by increasing the length and other dimensions of the canopy hoist, as would be apparent to those skilled in the art. The tarp puller consists of two heavy duty pivoting steel arms. Each arm is mounted to approximately two cubic feet of concrete at either end of the greenhouse and can be assembled and install with simple hand tools.

SUMMARY OF THE DISCLOSURE

Described herein is a device for lifting a cover, such as a light impeding tarp made of natural or artificial fabric or plastic over a structure. In the disclosed embodiment, the structure has a generally rectangular base to which semi-circular support members are attached to form a half cylinder with the rectangular side placed on the ground over the growing plants. The cover is sized to fit over the semi-circular support members and is positioned near the structure along one of the longer sides of the rectangle, or along any side of the rectangle if it is a square. An arm on the canopy hoist is attached to the canopy. The hoist is then rotated so that the canopy, which had been lying on the ground, is pulled over the semi-circular support members to the side of the rectangle opposite to the side near which the canopy was originally placed. In this position, the canopy inhibits the light passing to the growing plants. When the operation is reversed, the hoist is rotated in the opposite direction and the hoist arm pulls the canopy back to its original position on the ground.

An object of the current disclosure is to provide an efficient and easily operable mechanism to move a canopy over a structure and then to retract the canopy back to its original position. Another object is to accomplish this function with a low cost, simple to manufacture device that is sufficiently strong, can withstand varied outdoor environments and is easily operable.

The accompanying diagrams and descriptions will aid in the visualization of the described features, and functionality of the device.

DESCRIPTION OF THE DISCLOSED EMBODIMENT

Figure 1:
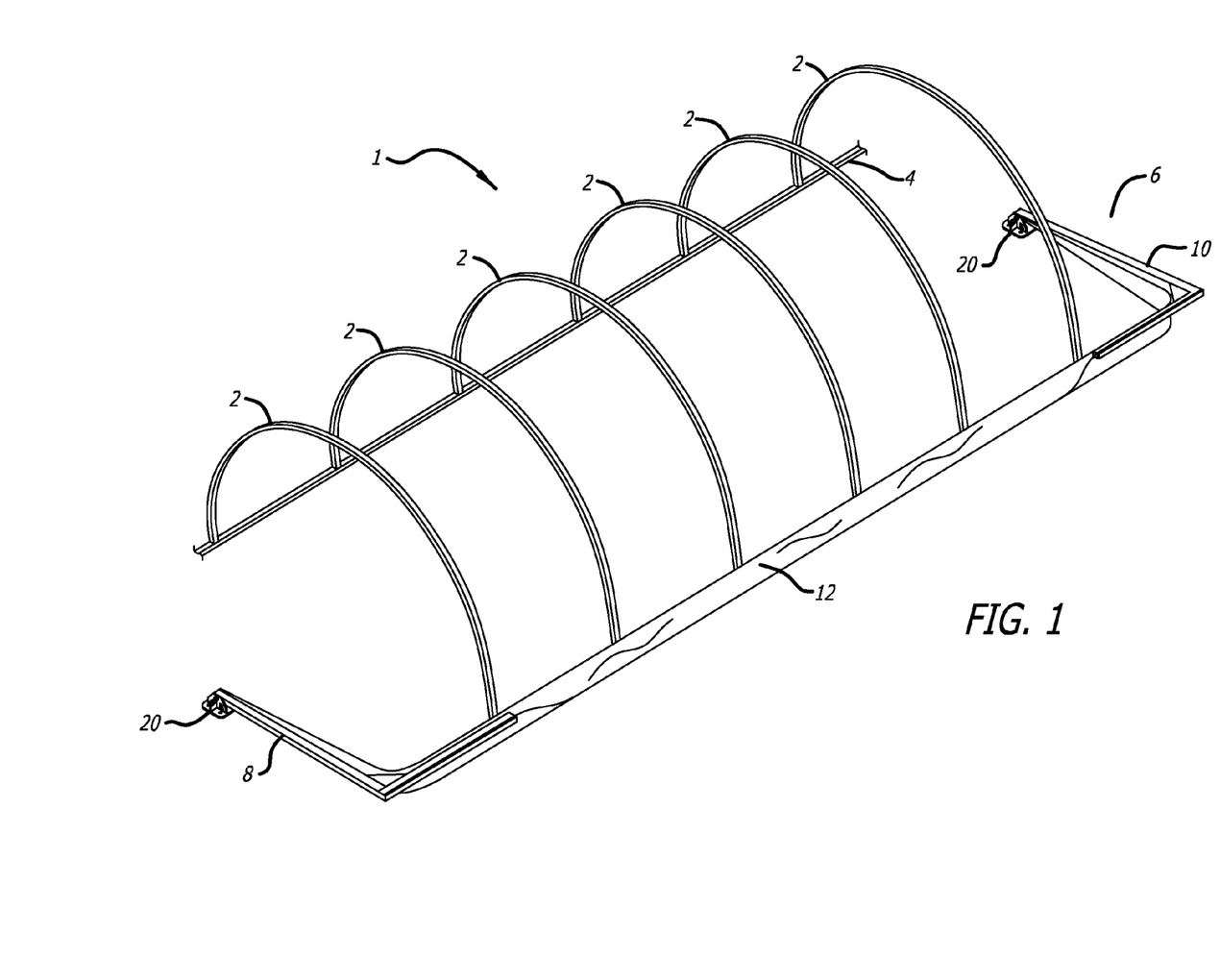
FIG. 1 is a perspective view of a generic canopy support structure with canopy hoist devices at each end of the support structure.

FIG. 1 is a perspective view of a generic canopy support structure 1 with two canopy hoist devices at each end of the support structure. Tarp support members 2 are depicted as rounded hoops attached to a base 4. The structure of base 4 is not shown in detail because the structure could be any configuration to which tarp support members 2 could be attached. In fact, tarp support members 2 could be driven into the ground 6 so that no base is required. Although not depicted, lengthwise cross members parallel to the base 4 may be added to interconnect the tarp support members to each other to add stability to the support members 2. Plants will typically be growing in the ground 6 within the periphery of the canopy support structure 1. The canopy support devices are depicted as near end hoist 8 and far end hoist 10. The details of the near and far end hoists 8 and 10 are not shown in FIGS. 1-3 for simplicity. Those details are best seen in FIGS. 4, 4A, 6 and 7. The canopy support structure 1 can be sized as desired. A typical size, for illustrative purposes only, would be a length of between 10 and 100 feet, a width of about 20 feet a height of about 10 feet. In the embodiment described herein, the near end hoist 8 and the far end hoist 10 have the same structure. In other words, the same hoist will work at both ends of the canopy support structure 1. This allows for greater manufacturing efficiency and lower cost.

Figure 2:
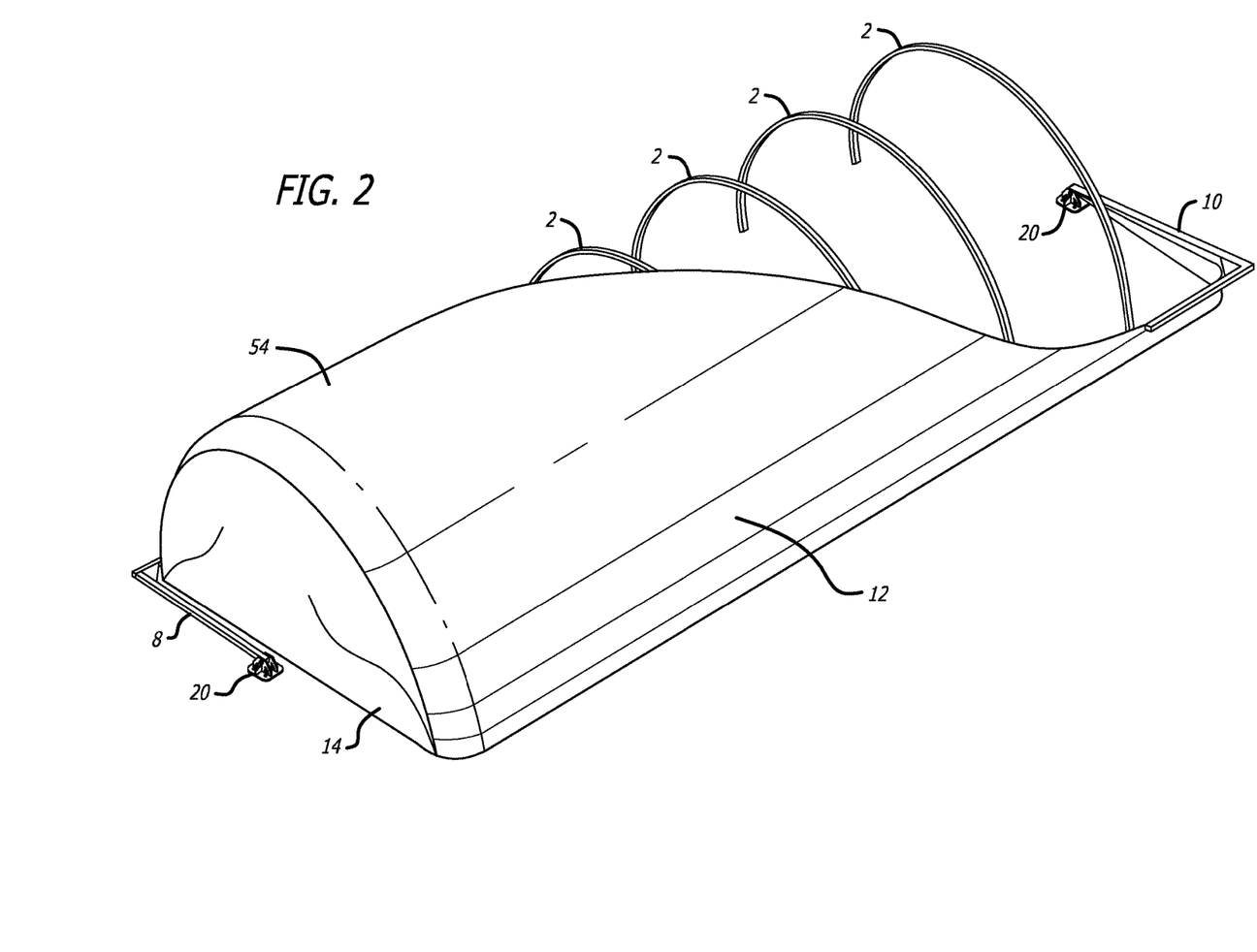
FIG. 2 is a perspective view depicting a tarp in the process of being pulled over the support structure by one of the canopy hoist devices.

A tarp 12 is shown schematically in FIG. 1. It should be understood that tarp selection depends on a number of variables such as desired thickness, weight and flexibility. In typical use, the tarp 12 would be bunched up on the ground 6 when the structure is fully opened. The tarp should also include sufficient extra length to provide slack so that when the tarp 12 is being moved from the open position as depicted schematically in FIG. 1 to the closed position depicted in FIG. 3 there is sufficient slack to allow the tarp 12 to cross over the tarp support members 2 diagonally as depicted in FIG. 2. For example, if the canopy support structure 1 is long, perhaps 100 feet, the amount of slack should be on the order of about 3 feet. If the canopy support structure is shorter, perhaps less than 40 feet, the amount of slack needs to be greater, on the order of 10 feet so that the tarp 12 can be moved as depicted in FIG. 2.

Figure 3:
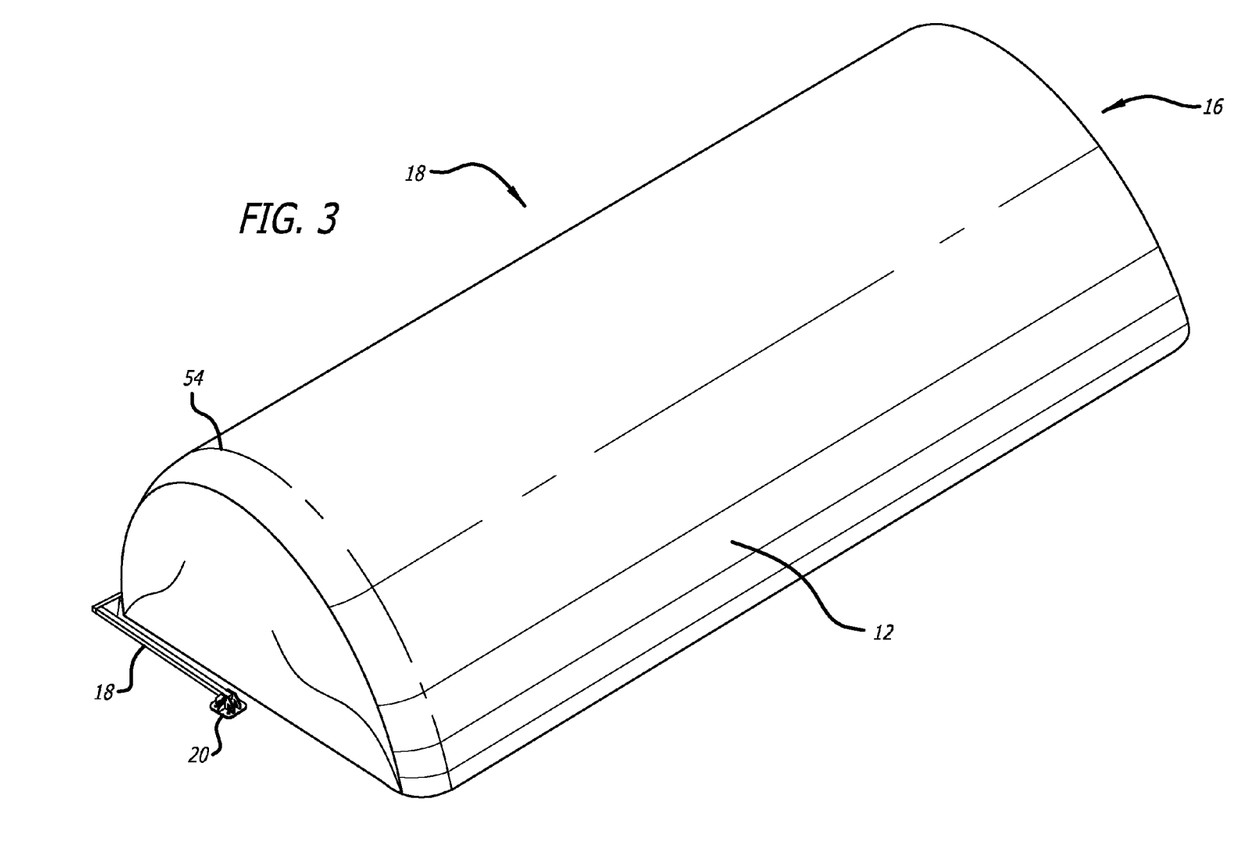
FIG. 3 is a perspective view depicting a tarp that has been fully pulled over the support structure.

FIG. 2 illustrates how the two canopy hoists 8 and 10 may be operated by one person. FIG. 1 depicts the near end hoist 8 in the canopy's fully opened position. FIG. 2 depicts the near end hoist 8 having been rotated from the canopy's fully opened position to a partially closed position. At this point, the tarp 12 has been pulled partially over the tarp support members 2 of the canopy support structure 1. The operator would then move to the far end hoist 10 and rotate it in a similar fashion in order to pull the balance of tarp 12 over the tarp support members 2. The result is a fully covered structure as depicted in FIG. 3. The near and far end hoists 8 and 10 could be rotated by two people as well. This process is reversed in order to pull the tarp in the opposite direction in order to remove the tarp from the tarp support members 2.

FIG. 3 depicts the tarp 12 after it has been fully pulled over the tarp support members 2. In the figures, the tarp support members 2 are shown as semi-circular ribs but they could have many different shapes. The most important design constraint would be to provide a shape that allows the tarp to slide over the support members without tearing or becoming hung up on protrusions. For example, instead of the support members being entirely curved they could be "U" shaped, with each having a curved upper portion and a straight lower portion between the curved portion and the ground 6 area.

FIGS. 2 and 3 show a near end tarp flap 14 that covers the opening at the near end of the canopy support structure 1. There is a similar far end tarp flap at the far end 16 of canopy support structure 1. In the disclosed embodiment, the tarp flaps are simply extensions of the tarp 12 that hang down to cover the openings at each end of the closed canopy 18.

Figures 4, 4A:
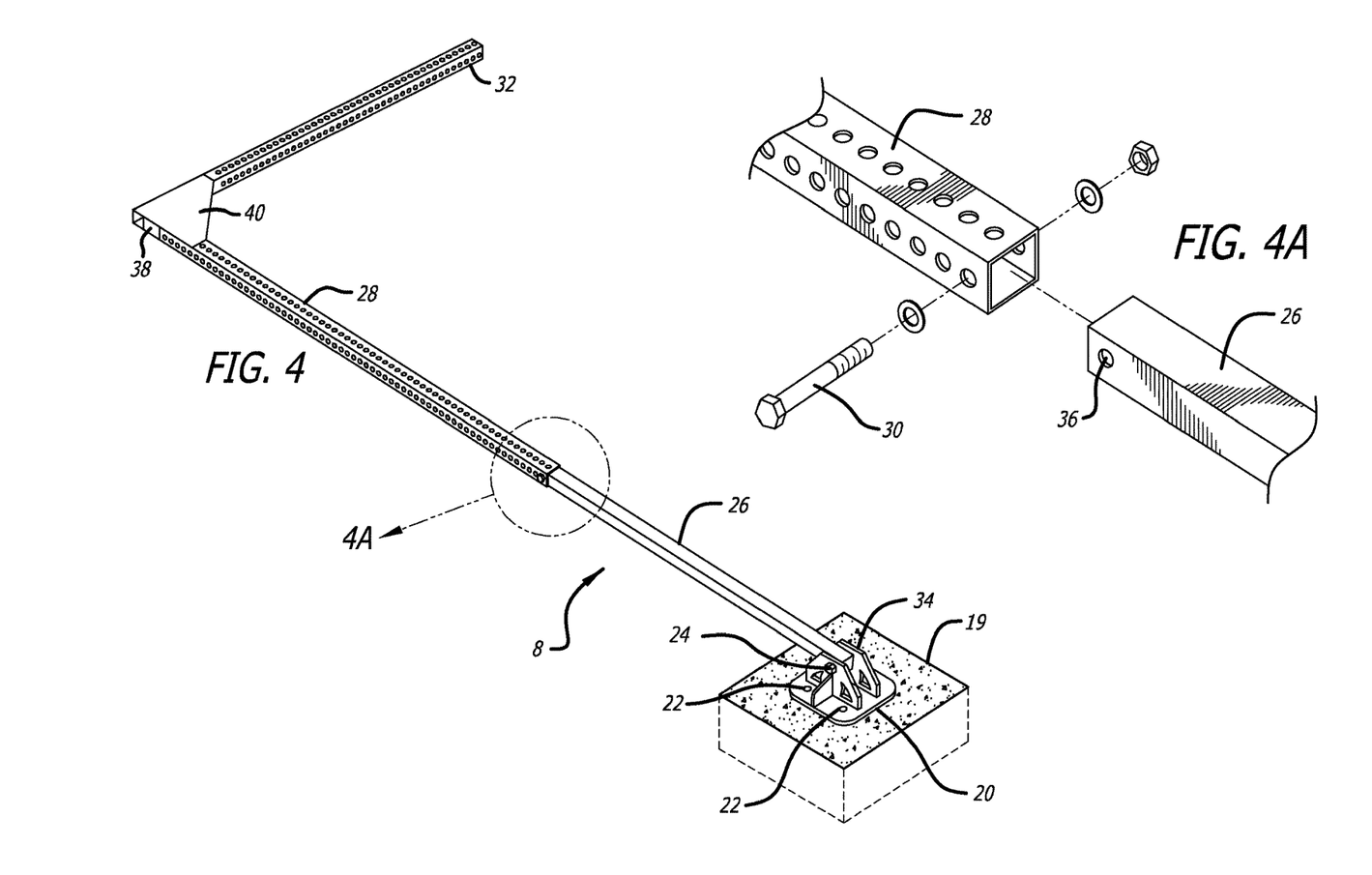
FIG. 4 is a perspective view depicting a canopy hoist device with its arms essentially parallel to the ground.
FIG. 4A is a perspective view of area 4A in FIG. 4 to show details of a telescoping connection.

FIG. 4. shows details of the construction of near end hoist 8. The same structure is present in far end hoist 10. In the disclosed embodiment, the near and far end hoists 8 and 10 are interchangeable. For simplicity, the structure will be described below referring only to near end hoist 8, but the same structure is present in far end hoist 10. A foundation 19 is embedded into the ground 6. In the disclosed embodiment, the foundation 19 is a rectangular solid of concrete. The base plate 20 is anchored to the foundation 19 by anchor bolts (not shown) protruding from the foundation 19 and up through anchor bolt holes 22. Typically, there will be four anchor bolts that pass through four anchor bolt holes. As is known in the art, nuts are screwed on the anchor bolts to secure the base plate 20 to the foundation 19. A support frame 34 is affixed to base plate 20 preferably by welding. A pivot arm 26 is attached to the support frame by a pivot pin 24 that passes through holes in the support frame 34 and through a compatible through hole in the pivot arm 26. The pivot pin 24 can be a bolt that permits the pivot arm 26 to rotate about pivot pin 24. The pivot arm 26 has a generally square cross section and in the disclosed embodiment is a hollow tube. The pivot arm 26 can be sized according to the anticipated load, but for most purposes, the outer cross sectional height will be about two inches and the inner cross sectional height will be about one and a half inches. The thickness of each side will therefore be about one quarter inch. However, the exact sizes are not critical to the functionality of the device.

Sliding over the pivot arm 26 is a perforated tube 28. These components interact telescopically so that the total length of the hoist can be changed to accommodate different size canopy support structures 1. For example, the pivot arm 26 and the perforated tube 28 can both be about seven feet long. This will allow the total length of the hoist to be adapted to canopy support structures 1 that are between approximately six feet high to about twelve feet high. The adaptability of the near and far end hoists 8 and 10 to various sizes of canopy support structures 1 give the disclosed device great utility, heretofore unknown in this field. FIG. 4A shows how the telescoping members 26 and 28 can be connected at the chosen length by using an attachment bolt 30 passing through compatible holes in the pivot arm 26 and the perforated tube 28. FIG. 4A shows one hole 36, but additional holes may be added to accept additional attachment bolts 30. Attachment bolt 30 is shown in FIG. 4A as passing through one particular hole in perforated tube 28, but as the pivot arm 26 slides telescopically into perforated tube 28, attachment bolt 30 can be moved to other positions to correspond with hole 36 on the pivot arm 26.

Figure 5:
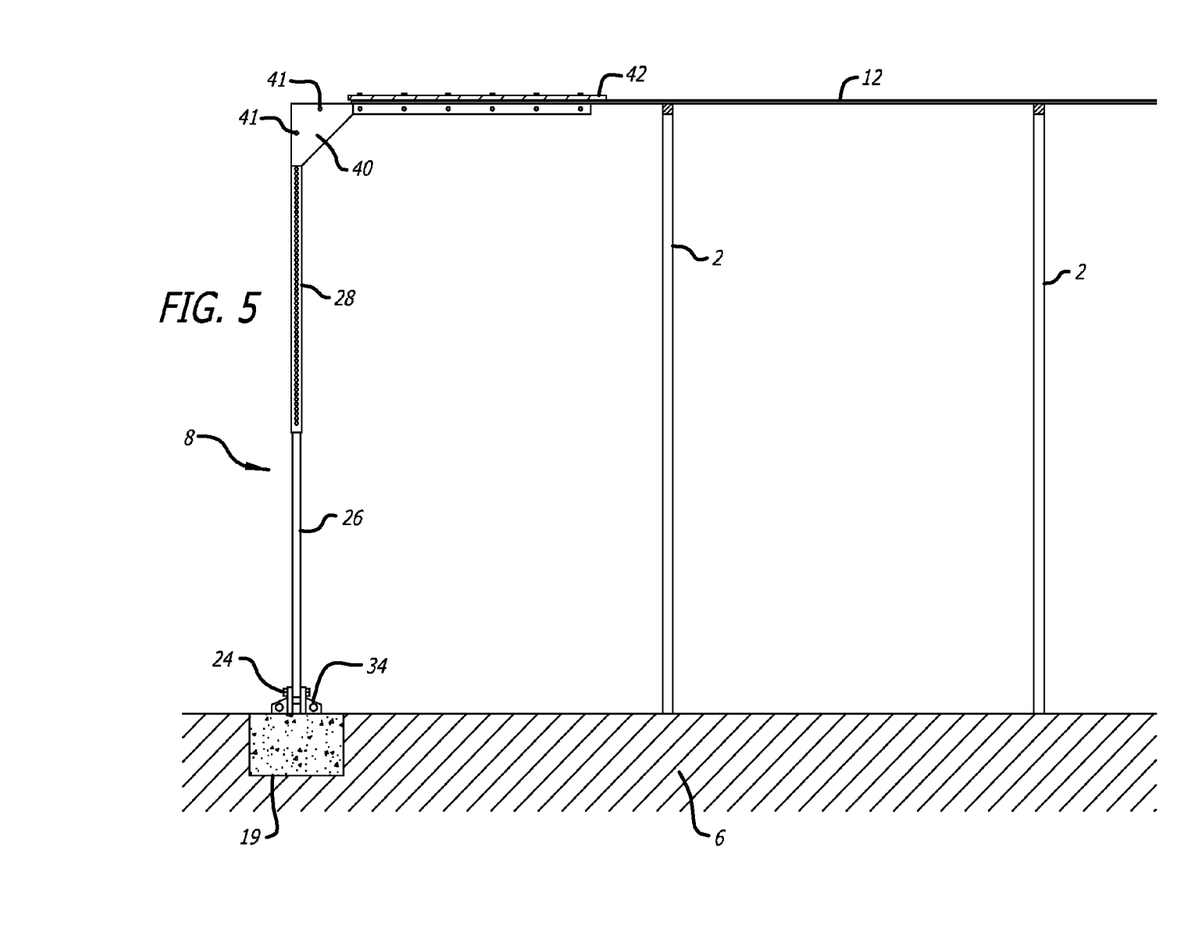
FIG. 5 is a cut-away side view of a portion of the canopy support structure depicting one canopy hoist device at the midpoint of its travel.
Figure 6:
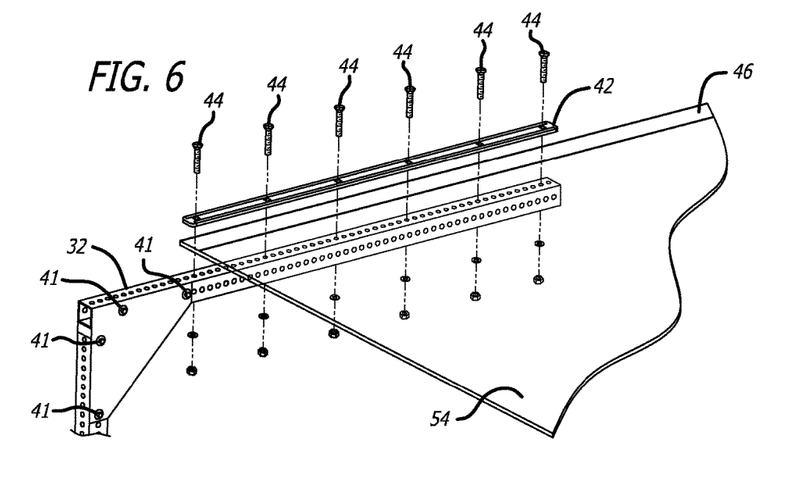
FIG. 6 is a perspective view depicting the features used to attach a tarp to a canopy hoist device.

A canopy arm 32 is attached to the perforated tube 28 using various methods such as welding or bolting. In FIG. 4, an attachment tube 38 is shown. Attachment tube 38 telescopically slides into the perforated tube 28 and is secured by a bolt in much the same manner as the attachment bolt 30 secures the telescoping portions 26 and 28 together. Attachment tube 38 does not need to have the same telescoping length as the perforated tube 28 and the pivot arm 26 and can be much shorter. Having this capability allows the hoist 8 to be disassembled into components that are easy to package and transport. Adding rigidity to the structure is a gusset plate 40 that is bolted or screwed to both the perforated tube 28 and the canopy arm 32. The gusset plate 40 in FIG. 4 is shown as partially transparent so that the underlying holes in the perforated tube 28 and canopy arm 32 are visible. An opaque depiction of solid gusset plate 40 can be seen in FIG. 5. Also seen in FIG. 5 are the heads of gusset bolts 41 that pass through compatible holes in the gusset plate 40. Two similar gusset plates 40 can be used, one on each side of the hoist 8 for added strength, with the gusset bolts 41 passing through both gusset plates. In FIG. 6, four gusset bolts 41 are shown as an alternative embodiment.

FIG. 5 is a cut-away side view of a portion of the canopy support structure depicting one canopy hoist device at the midpoint of its travel, in other words, at the height of its arc over the canopy support structure 1. Tarp 12 is shown resting on tarp support members 2. The tarp 12 is secured to the hoist 8 by a clamp bar 42, which is shown in more detail in FIGS. 6 and 7.

Figure 7:
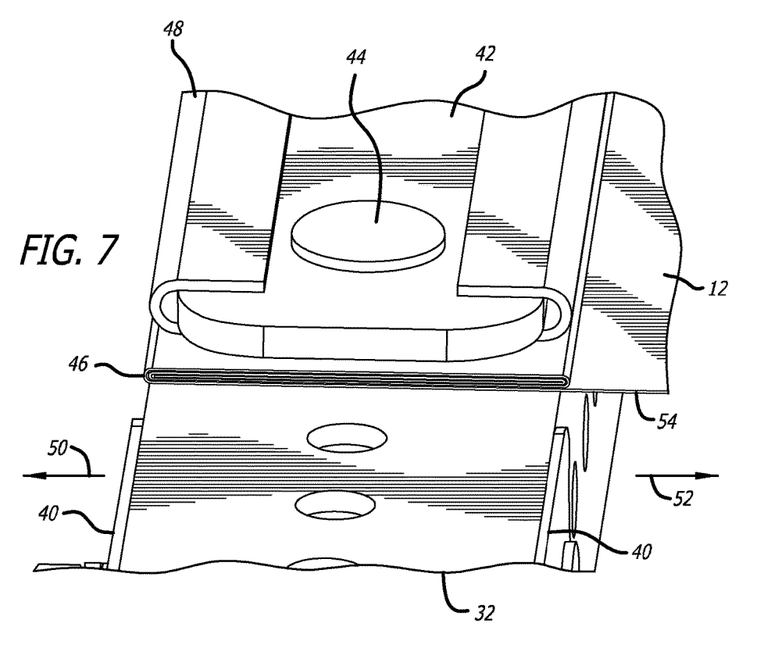
FIG. 7 is a perspective view of the attachment feature of FIG. 6.

Clamp bar 42 can be made in various lengths depending on the weight of the tarp to be pulled over the support members 2, but in the depicted embodiment the length is about six feet. The clamp bar 42 will typically be made of the same material as the canopy hoist itself, preferably aluminum or steel. The portion of the edge of tarp 12 that is to be held between the clamp bar 42 and the canopy arm 32 is folded a number of times into a folded portion 46 to provide strength because when the carriage bolts 44 are inserted through the tarp the resulting holes in the tarp create stress risers. Of course, if a tarp has a strongly reinforced edge, the folding may not be required. However, because the intent of the inventors is to have a canopy hoist that can work with many different styles of tarp, the folding step is described so that a common, inexpensive tarp may be used in conjunction with the disclosed canopy hoist device. The folded portion 46 is shown in FIGS. 6 and 7. It is suggested that the tarp be folded four times prior to pushing the carriage bolts through the tarp in the orientation shown in FIG. 6. Tarp 12 is shown as being partially transparent in FIG. 6 for illustrative purposes only so that the underlying structure can be seen.

FIG. 7 shows the same components as in FIG. 6 with the friction lining 48 being more clearly visible. The friction lining 48, which can be a resilient material such as rubber, spreads the force of the clamp bar 42 more evenly over the surface of the folded portion 46 of the tarp 12 to hold it securely in place without slipping between the metal surfaces of the clamp bar 42 and the canopy arm 32. The holes made in the tarp 12 by the carriage bolts 44 therefore do not take the entire load when the tarp is being moved by the rotational action of the canopy hoists 8 and 10. The directions are shown in FIG. 7 as closing direction 50 and opening direction 52. The closing direction 50 means that the canopy hoists 8 and/or 10 are being rotated about their respective pivot pins 24 and the tarp 12 is being is being pulled from the position shown in FIG. 1 to the position shown in FIG. 3. The opening direction 52 means the opposite, when the tarp 12 is being pulled from the closed position depicted in FIG. 3 to the open position shown in FIG. 1.

It should be noted that in FIGS. 6 and 7 the tarp is cut off at edge 54, which is roughly shown in FIGS. 2 and 3. This is for illustrative purposes only and is not meant to depict exact locations. The remainder of the tarp 12 was omitted from FIGS. 6 and 7 so that the underlying structure would be more clearly visible.

Figure 8:
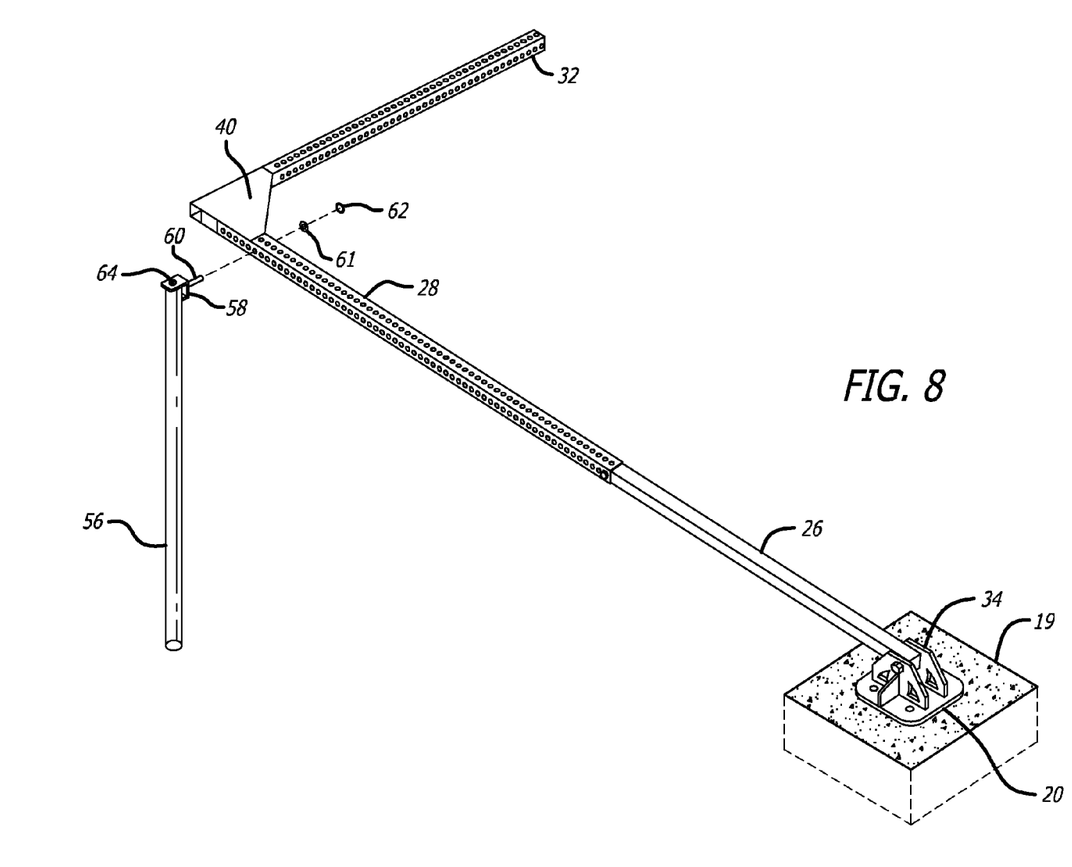
FIG. 8 is a perspective view of a canopy hoist device and push rod.
Figure 9:
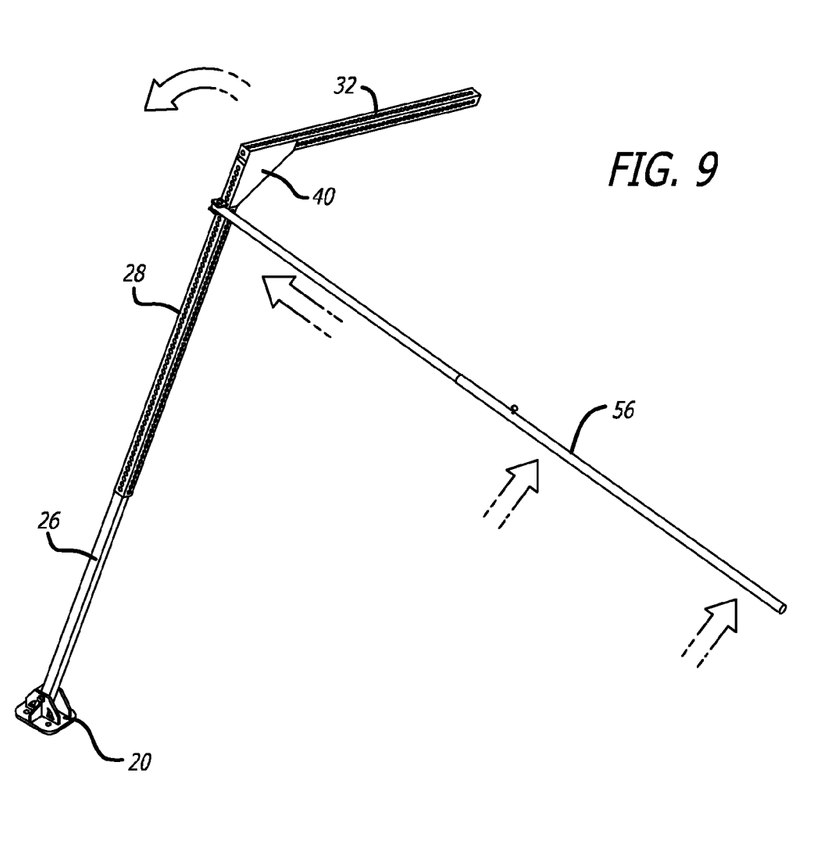
FIG. 9 is a perspective view of a canopy hoist device and push rod with directional arrows.

A push arm may be used to assist the operator in rotating the canopy hoist about the pivot pin 24 to close or open the tarp 12. It can be used for any size structure but is especially helpful in conjunction with large canopy support structures 1, such as those that are perhaps ten feet tall or higher. In this situation, a canopy hoist would have to be longer than 10 feet in order to pull the tarp 12 over the tarp support members 2. An operator may be able to exert reasonable force up to a height of perhaps six feet or so, but the operator's leverage would decrease quickly at the length of the canopy hoist increased. This discussion is, of course, applicable to both the near end hoist 8 and far end hoist 10. The push arm feature is shown in FIGS. 8 and 9. Push rod 56 is attached to the perforated tube 28 at a location relatively near to the gusset 40. The operator can then exert force high on the perforated tube 28 for greater leverage while rotating the near and/or far end hoists 8 and 10. The length of the push rod 56 may be sized as needed given the total length of the near and far end hoists 8 and 10. The push rod 56 may have telescoping segments. FIG. 9 includes arrows that show directions of force and motion as the push rod 56 is being operated.

The connection between the push rod 56 and the perforated tube 28 is a rotating or universal joint that allows transmission of force over a range of angles. It is depicted in the figures as a "U" shaped end assembly 58 that includes an attachment pin 60 that is placed into holes in the perforated tube 28. Attachment pin 60 is a clevis pin that includes a through-hole near its free end. Once installed, a washer 61 is placed over the end of pin 60 and a split ring 62 or cotter pin is inserted into the through-hole to secure the end assembly to the perforated tube 28. The assembly 58 is secured to the push rod 56 with a clevis pin 64. This design allows rotation about both the attachment pin 60 and clevis pin 64. An operator can therefore use the push rod 56 through an entire range of motion from one side of the canopy support structure to the other when opening or closing tarp 12 without having to release his hold on the push rod 56. Although it is denominated a "push" rod, 56 can also be used to pull the near and far end hoists 8 and 10 as appropriate to open or close the tarp 12.

While the above description contains many specifics, these should not be construed as limitations on the scope of the disclosure, but rather as an exemplification of the embodiments therein. It is to be understood that the invention is not limited to these specific embodiments. Accordingly, the invention is not limited to the precise embodiments described in detail hereinabove. With respect to the claims, it is applicant's intention that the claims not be interpreted in accordance with the sixth paragraph of 35 U.S.C. § 112 unless the term "means" is used followed by a functional statement. Further, with respect to the claims, it should be understood that any of the claims described below may be combined for the purposes of the invention.

The invention claimed is:

1. A canopy hoist for moving a cover over a structure between substantially open and substantially closed positions, the structure standing over growing plants, comprising:

a canopy arm;
a clamp on the canopy arm for attaching the cover;
the canopy arm attached to a telescoping member;
the telescoping member attached rotationally to a base;
whereby when the telescoping member is rotated, the telescoping member provides force driving the canopy arm thereby moving the cover between substantially open and substantially closed positions;
a clamp bar;
a friction lining;
a plurality of clamp bar holes in the clamp bar;
a plurality of friction lining holes in the friction lining corresponding to the clamp bar holes;
a plurality of canopy arm holes in the canopy arm corresponding to the friction lining holes and the clamp bar holes;
said clamp bar, friction lining and canopy arm adapted to receiving a portion of the cover; and
fasteners passing through the clamp bar holes, the friction lining holes and the clamp bar holes;
whereby the cover is secured to the canopy arm.

2. A canopy hoist for moving a cover over a structure between substantially open and substantially closed positions, the structure standing over growing plants, comprising:

a canopy arm;

the cover having a leading edge adapted to be attached to the canopy arm;

a clamp on the canopy arm for attaching to a portion of the leading edge of the cover;

the canopy arm attached to a pivot arm;

the pivot arm attached rotationally to a base;

whereby when the pivot arm is rotated the pivot arm provides force driving the canopy arm thereby moving the leading edge of the cover in an arcuate path between substantially open and substantially closed positions;

a clamp bar;

a friction lining;

a plurality of clamp bar holes in the clamp bar;

a plurality of friction lining holes in the friction lining corresponding to the clamp bar holes;

a plurality of canopy arm holes in the canopy arm corresponding to the friction lining holes and the clamp bar holes;

said clamp bar, friction lining and canopy arm adapted to receiving a portion of the cover; and fasteners passing through the clamp bar holes, the friction lining holes and the clamp bar holes;

whereby the cover is secured to the canopy arm.

* * * * *